US012630183B2

(12) United States Patent
Mueller et al.

(10) Patent No.: US 12,630,183 B2
(45) Date of Patent: May 19, 2026

(54) COMPUTER-IMPLEMENTED METHOD AND SYSTEM FOR PLANNING THE BEHAVIOR OF A VEHICLE

(71) Applicant: Robert Bosch GmbH, Stuttgart (DE)

(72) Inventors: Johannes Christian Mueller, Ostelsheim (DE); Anne Von Vietinghoff, Renningen (DE); Christian Heinzemann, Vellmar (DE); Heiko Freienstein, Weil der Stadt (DE); Jens Oehlerking, Stuttgart (DE); Martin Butz, Steinheim an der Murr (DE); Martin Herrmann, Korntal (DE); Michael Rittel, Markgroeningen (DE); Ralf Kohlhaas, Calw (DE); Stefan Ruppin, Grafenau (DE); Steffen Knoop, Hohenwettersbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 76 days.

(21) Appl. No.: 18/443,078

(22) Filed: Feb. 15, 2024

(65) Prior Publication Data

US 2024/0300530 A1 Sep. 12, 2024

(30) Foreign Application Priority Data

Mar. 6, 2023 (DE) ..................... 10 2023 201 983.3

(51) Int. Cl.
*B60W 60/00* (2020.01)

(52) U.S. Cl.
CPC .... *B60W 60/0011* (2020.02); *B60W 60/0015* (2020.02)

(58) Field of Classification Search
CPC ......... B60W 60/0011; B60W 60/0015; B60W 60/001; B60W 40/02
See application file for complete search history.

(56) References Cited

U.S. PATENT DOCUMENTS

| | | | |
|---|---|---|---|
| 11,392,120 B2 | 7/2022 | Censi | |
| 2021/0107486 A1* | 4/2021 | Oh ................... | B60W 60/00274 |
| 2021/0356962 A1* | 11/2021 | Censi ..................... | G06F 40/216 |
| 2023/0026459 A1* | 1/2023 | Schnee ................... | H04W 4/80 |

* cited by examiner

*Primary Examiner* — Joan T Goodbody
*Assistant Examiner* — Godfrey Aleksander Maciorowski
(74) *Attorney, Agent, or Firm* — NORTON ROSE FULBRIGHT US LLP

(57) ABSTRACT

A computer-implemented method and a corresponding system for planning the behavior of a vehicle using a predefined set of rules with prioritized rules for assessing possible behaviors of the vehicle in a given situation. For this purpose, situation-specific information is aggregated, and an environmental model of the given situation is generated based on the aggregated situation-specific information. The set of rules includes a decision-making process structure, which represents the prioritization of the individual rules of the set of rules. On the basis of the environmental mode, boundary conditions for the possible behaviors of the vehicle are determined. The latter are then prioritized by applying the decision-making process structure to the respective boundary conditions.

13 Claims, 2 Drawing Sheets

COMPUTER-IMPLEMENTED METHOD AND SYSTEM FOR PLANNING THE BEHAVIOR OF A VEHICLE

CROSS REFERENCE

The present application claims the benefit under 35 U.S.C. § 119 of German Patent Application No. DE 10 2023 201 983.3 filed on Mar. 6, 2023, which is expressly incorporated herein by reference in its entirety.

FIELD

The present invention relates to a computer-implemented method for planning the behavior of a vehicle using a predefined set of rules with prioritized rules for assessing possible behaviors of the vehicle in a given situation, wherein situation-specific information is aggregated, and an environmental model of the given situation is generated on the basis of the aggregated situation-specific information.

Furthermore, the present invention relates to a computer-implemented system for planning the behavior of a vehicle, wherein the system comprises at least one perception module for aggregating situation-specific information and generating an environmental model on the basis of the situation-specific information.

The present invention is in particular suitable for planning the behavior of an at least partially automated vehicle but can also be used within the framework of traditional assistance functions.

BACKGROUND INFORMATION

Such a method or system is described in U.S. Pat. No. 11,392,120, for example. In particular, a set of rules for the behavior of an at least partially automated vehicle is described therein, and also the implementation thereof in the form of logical expressions and logical relationships. The individual rules of this set of rules are based on social, cultural, legal, ethical, moral, or even other behavioral rules, principles or norms, such as traffic laws, traffic rules, cultural behavioral rules in traffic, rules for the use of roads and other drivable areas, preferred driving styles, pedestrian behavior, and driving experiences. The set of rules provides for classification of the rules into priority classes according to their significance or importance. In this way, the rules of the set of rules can be prioritized in relation to one another. For example, individual rules may always, or even only in certain cases, be given priority over other rules, depending on the significance or importance of the relevant rules in a given traffic situation. According to U.S. Pat. No. 11,392,120, a deviation from the rules of the set of rules is determined and quantitatively assessed by means of a metric (deviation metric) not specified in more detail, wherein this metric is in this case used to assess vehicle trajectories. Thus, each trajectory proposal is first assessed individually in order to thereafter select and implement the trajectory proposal whose deviation, determined in the metric, from the rules of the set of rules is least.

The procedure described in U.S. Pat. No. 11,392,120 proves to be problematic in practice in several respects.

U.S. Pat. No. 11,392,120 follows a sampling-based approach, according to which possible behaviors of the vehicle are always first detailed in the form of trajectory proposals. Only thereafter are the trajectory proposals assessed. Detailing all trajectory proposals is associated with a comparatively high computing effort.

According to U.S. Pat. No. 11,392,120, the trajectory proposals are assessed by means of the set of rules, namely individually and independently of one another. This assessment is based on a specified metric for the deviation from the rules of the set of rules and therefore decisively depends on the respective definition of this metric. Particularly problematic in this context is that such a metric-based assessment does not allow any conclusions to be drawn about the rules that are possibly violated or observed.

According to U.S. Pat. No. 11,392,120, the assessment is used to select a trajectory proposal, which is then to be taken as a basis for automated vehicle control. Ranking of the individual trajectory proposals or possible behaviors is not provided. However, a list of possible behaviors sorted by priorities could, for example, be advantageous in order to identify fallback solutions if a higher-priority behavior cannot be realized.

SUMMARY

The present invention provides measures for simplifying vehicle behavior planning.

For this purpose, the computer-implemented method according to an example embodiment of the present invention for planning the behavior of a vehicle uses a predefined set of rules with a decision-making process structure, which represents the prioritization of the individual rules of the set of rules. Within the framework of the method according to the present invention, boundary conditions for the possible behaviors of the vehicle are determined on the basis of the environmental model. That is to say, the possible behaviors of the vehicle are not necessarily detailed in the form of trajectories but are rather defined through boundary conditions. These boundary conditions are requirements for the behavior of the vehicle that result from the environmental model. According to the present invention, prioritization of the possible behaviors defined in this way is then performed by applying the decision-making process structure of the set of rules to the respective boundary conditions.

For this purpose, the computer-implemented system according to an example embodiment of the present invention for planning the behavior of a vehicle comprises an analysis module, with which the boundary conditions for possible behaviors of the vehicle in the given situation are respectively determined. Furthermore, the system comprises a predefined set of rules for assessing and prioritizing the possible behaviors on the basis of the boundary conditions, wherein the set of rules comprises a decision-making process structure, which represents the prioritization of the rules of the set of rules.

At this point, it is noted that the set of rules may comprise a wide variety of rules and that these rules may also be defined in very different ways. For example, the rules of the set of rules may be defined according to U.S. Pat. No. 11,392,120 discussed above. Since the set of rules is usually used to justify the safety of the behavior planning, the predefined set of rules comprises and prioritizes safety requirements and/or traffic rules in a preferred embodiment of the present invention. Furthermore, it may comprise and prioritize comfort requirements and/or technical vehicle boundary conditions. In any case, the prioritization of the individual rules of the set of rules is however defined by a decision-making process structure. This decision-making process structure determines the test sequence for comparing the boundary conditions of the individual possible behaviors to the rules of the set of rules.

A particular advantage of the method according to an example embodiment of the present invention is that the application of the decision-making process structure of the set of rules to the respective boundary conditions of the possible behaviors provides a ranking of the possible behaviors. This is because, by applying the decision-making process structure of the set of rules to the respective boundary conditions of the possible behaviors of the vehicle, it is systematically checked for each possible behavior which rules of the set of rules are observed and which rules are violated. In doing so, a list of possible behaviors sorted by priorities is automatically generated. The prioritization of the possible behaviors of the vehicle thus takes place in an automated manner and is performed dynamically at the runtime of the system. A specific metric is not required for this purpose. The prioritization is based solely on the decision-making process structure of the set of rules and is "absolute" in this respect. This absolute prioritization of behaviors can ensure the implementation of a desired behavior for an AD vehicle.

In the simplest case, the decision-making process structure of the set of rules used according to the present invention is a binary decision tree. However, it could also be a different, more complex structure, such as a finite decision tree, which allows a finite number of possible selections per condition.

In principle, there are various coding possibilities for the result of applying the decision-making process structure to the boundary conditions of a possible behavior.

In the simplest case, a bitset is generated that encodes the boundary conditions as options of the decision-making process structure or as leaves of a decision tree. A unique bitset, i.e., a characteristic sequence of ones and zeros, is thereby assigned to each possible behavior.

According to an example embodiment of the present invention, the decision tree could advantageously be designed such that the priority of a possible behavior is decisively determined by the location where the first one is generated in the bitset, so that the priority of a possible behavior is thus the higher, the further toward the front/left a one appears in the corresponding bitset.

The unambiguously assignable bitsets also represent the comparison of the boundary conditions of the respective possible behavior to the rules of the set of rules. On the basis of the bitset of a possible behavior, it can therefore be clearly understood which rules of the set of rules are observed and which rules are not observed. Accordingly, the selection of a possible behavior for controlling the vehicle is completely transparent due to the associated bitset and can be retraced at any time. This proves to be advantageous in particular for a safety argumentation with respect to the behavior planning.

In a preferred embodiment of the present invention, a binary decision diagram (BDD) is generated for each possible behavior of the vehicle in that the decision-making process structure of the predefined set of rules is applied to the respective boundary conditions. Prioritization of the possible behaviors of the vehicle is then performed on the basis of the thus generated BDDs. BDDs make it possible to represent a binary decision tree more efficiently than the bitsets discussed above.

Alternatively, according to an example embodiment of the present invention, the individual possible behaviors can also be encoded in the form of finite decision diagrams (FDDs) if the decision-making process structure of the set of rules used according to the present invention is provided in the form of a finite decision tree.

In a particularly advantageous development of the method according to the present invention for behavior planning, the given situation is preclassified on the basis of the environmental model in that the given situation is assigned to at least one situation class from a set of specified situation classes. As a result, when prioritizing the possible behaviors, the decision-making process structure can be limited to those rules that can be applied to situations of the at least one situation class ascertained in this way. By preclassifying the given situation, the portion to be processed of the decision-making process structure, i.e., the size of the decision tree to be processed, and thus the number of required bits in the bitset can be kept at a manageable order of magnitude despite a set of rules with a large number of rules.

Advantageously, according to an example embodiment of the present invention, a context decision tree is used to preclassify the given situation. A context decision tree may, for example, include map information in order to distinguish different road infrastructure situations, such as the situation on a country road, an intersection situation, or a crosswalk situation. Furthermore, perception information, for example in the form of an occupancy grid map or an object representation of the environment, can be taken into account in a context decision tree. As a result, those rules of the set of rules that relate to pedestrians can, for example, be switched to inactive if there are no pedestrians in the environment of the vehicle. By means of a context decision tree for the preclassification of the given situation, the decision-making process structure can be rolled out at runtime as needed in that the branches or partial structures with inactive rules are automatically cut off the decision-making process structure or these branches are not queried. Accordingly, different parts of the set of rules can be activated or deactivated as a function of the preclassification of the given situation.

As mentioned above, the method according to the present invention requires only the determination of boundary conditions in order to define the possible behaviors of the vehicle. The detailing of one or more possible behaviors can also not take place until a later time. The possible behaviors of the vehicle in the given situation may also be defined by a set of behavior instructions that implement at least a portion of the respective boundary conditions, or also by a reference trajectory that fulfills at least a portion of the respective boundary conditions.

A particular advantage of the method according to the present invention is that a possible behavior of the vehicle to be implemented in the given situation must not be detailed and/or optimized with respect to a specified quality function until after the prioritization of the behaviors previously determined as possible. This contributes to significant savings in computing effort for the behavior planning and control of the vehicle.

DETAILED DESCRIPTION OF EXAMPLE EMBODIMENTS

Figure 1A:
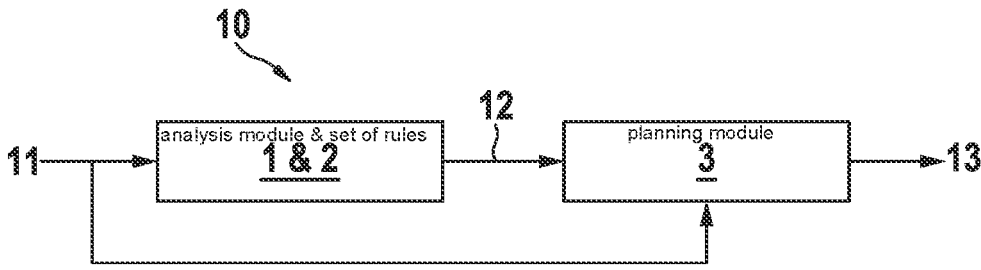
FIGS. 1A to 1C show different architectural variants of a computer-implemented system according to the present invention for planning the behavior of an at least partially automated vehicle.
Figure 1B:
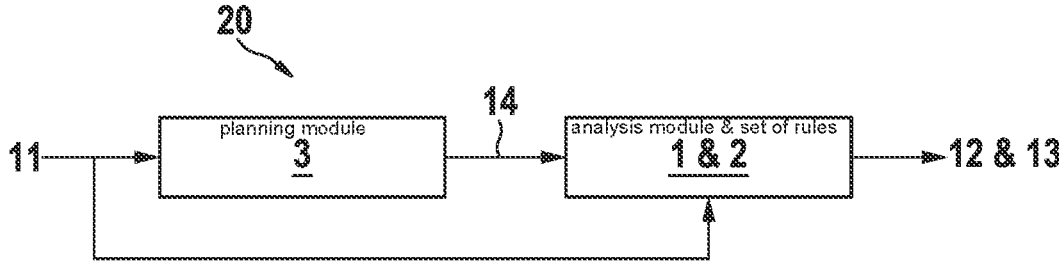
Figure 1C:
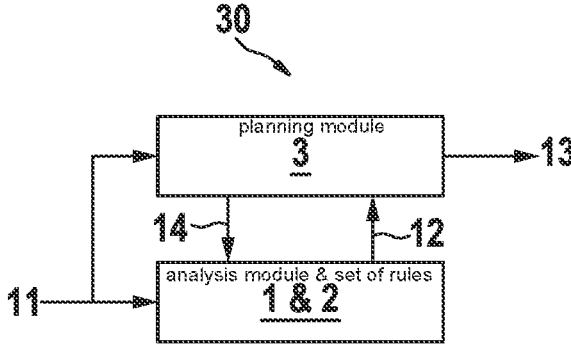

FIGS. 1A to 1C each show an architectural variant of a computer-implemented system 10, 20, and 30 according to the present invention for planning the behavior of an at least partially automated vehicle. Each of these systems 10, 20, and 30 comprises a perception module, not shown in detail here, for aggregating situation-specific information and generating an environmental model 11 on the basis of the situation-specific information. Main components of the systems 10, 20, and 30 are an analysis module 1 for determining boundary conditions for possible behaviors of the vehicle in the given situation and a predefined set of rules 2 for assessing and prioritizing the possible behaviors on the basis of the boundary conditions. It is essential to the present invention that the set of rules 2 comprises a decision-making process structure, which represents the prioritization of the rules of the set of rules 2. A decision-making process structure and its use within the framework of the present invention are explained in more detail in connection with FIG. 2. Since the prioritization of the possible behaviors in the exemplary embodiments described below is in each case performed by the analysis module 1, the set of rules 2 in FIGS. 1A to 1C is in each case shown as part of the analysis module 1. Furthermore, in the exemplary embodiments described here, the analysis module 1 is designed to perform a preclassification of the given situation on the basis of the environmental model 11 and by taking a set of specified situation classes as the basis, and, as a function of the preclassification of the given situation, to cut parts of the decision-making process structure, i.e., to not consider individual parts of the set of rules in the prioritization.

The analysis module 1 interacts with a planning module 3 whose task is to select and detail one of the possible behaviors such that the selected behavior can be implemented by controlling the actuator system of the vehicle accordingly. For this purpose, the planning module 3 can generate one or more trajectories or behavior instructions or also sets of constraints on the basis of the boundary conditions of the selected behavior. The three architectural variants shown in FIGS. 1A to 1C differ in how the analysis module 1 and the planning module 3 interact. These differences are due to the function blocks being partitioned differently. Thus, in certain exemplary embodiments, the analysis module can take on a portion of the planning and propose candidates for behaviors, which are then detailed by the planning module.

In the variant shown in FIG. 1A, the analysis module 1 determines possible behaviors of the vehicle by evaluating the environmental model 11. These possible behaviors are each defined by a set of boundary conditions. These boundary conditions are requirements for the behavior of the automated vehicle resulting from the environmental model 11. By applying the decision-making process structure of the set of rules 2 to the possible behaviors or to their boundary conditions, the possible behaviors are sorted by priority. The decision-making process structure of the set of rules 2 is characterized in that it assigns a higher priority to behaviors that better fulfill the rules of the set of rules 2. The resulting ranking of the possible behaviors is provided to the planning module 3, which is denoted by 12 here. At this point, it is noted that several possible behaviors can also have the same priority. These behaviors then form a priority class.

The planning module 3 selects usually only one or also several prioritized behaviors in order to detail and optimize them. In addition, the planning module 3 checks whether the detailed solution fulfills all boundary conditions required of it. The planning module 3 generally selects the possible behavior that fulfills all rules of the set of rules and has the highest priority as the solution. If several behaviors have the same priority, the solution that is best with respect to an optimality criterion is output.

In the simplest case, in a first step, the planning module 3 searches for trajectories 13 for the behaviors of the highest priority class, and only if no solution has been found for this priority class does a search for trajectories 13 for the behaviors of the second priority class take place, and so forth. However, further orders of execution are also possible, e.g., a fully or partially parallel processing or also giving preference to the calculation of a low-priority behavior with less severe boundary conditions, in order to be able to provide a valid solution, taking into account limited computing resources (anytime algorithm).

In the exemplary embodiment described here, the planning module provides as the result 13 either the detailing of the highest-priority possible behavior or a sorted list of detailed behaviors, wherein the detailings can be output in the form of trajectories, behavior instructions, or also sets of boundary conditions.

This procedure can enforce a safer behavior while observing all rules of the set of rules, if this is possible. If observing all rules of the set of rules is no longer possible, a solution in the form of a possible behavior that least violates the applicable boundary conditions can however still be provided. These rules may be strict, such as "stop in front of the traffic light," but also comparatively lenient, such as "drive past the obstacle rather than stop." The degradation approach proposed according to the present invention thus starts with all rules of the set of rules. Only if a solution in the form of a possible behavior cannot be found is a sub-set of the rules removed, wherein an order is defined as to which rules may be removed. This iteration is repeated until a solution is found.

In the system variant 20 shown in FIG. 1B, the planning module 3 is upstream of the analysis module 1 with the predefined set of rules 2. In this case, the planning module 3 generates an unsorted list of detailed behavior proposals 14 on the basis of environmental model 11. These behavior proposals 14 are then prioritized by the downstream analysis module 1 by means of the set of rules 2. By evaluating the environmental model 11, the analysis module 1 determines the boundary conditions of the individual possible behaviors of the vehicle independently of the planning module 3, in order to then apply the set of rules 2 to the boundary conditions of the individual possible behaviors. The analysis module 1 can then either select the detailed behavior proposal that corresponds to the highest-priority possible behavior, or generate a sorted list of detailed behaviors from the unsorted list of detailed behavior proposals and output it as the result 12, 13. In any case, in the variant shown in FIG. 1B, the prioritization is no longer returned to the planning module 3 but rather supplied to further processing.

In the system variant 30 shown in FIG. 1C, the analysis module 1 and the planning module 3 interact. The planning module 3 passes an unsorted list of detailed behavior proposals 14 to the analysis module 1. The analysis module 1 prioritizes this list by means of the predefined set of rules 2 and provides the result of the prioritization 12 to the planning module 3 so that the planning module 3 can then further detail and process the behavior proposals in the appropriate order and output them as the result 13. Thus, during its execution, the planning module 3 obtains feedback from the analysis module 1.

Figure 2:
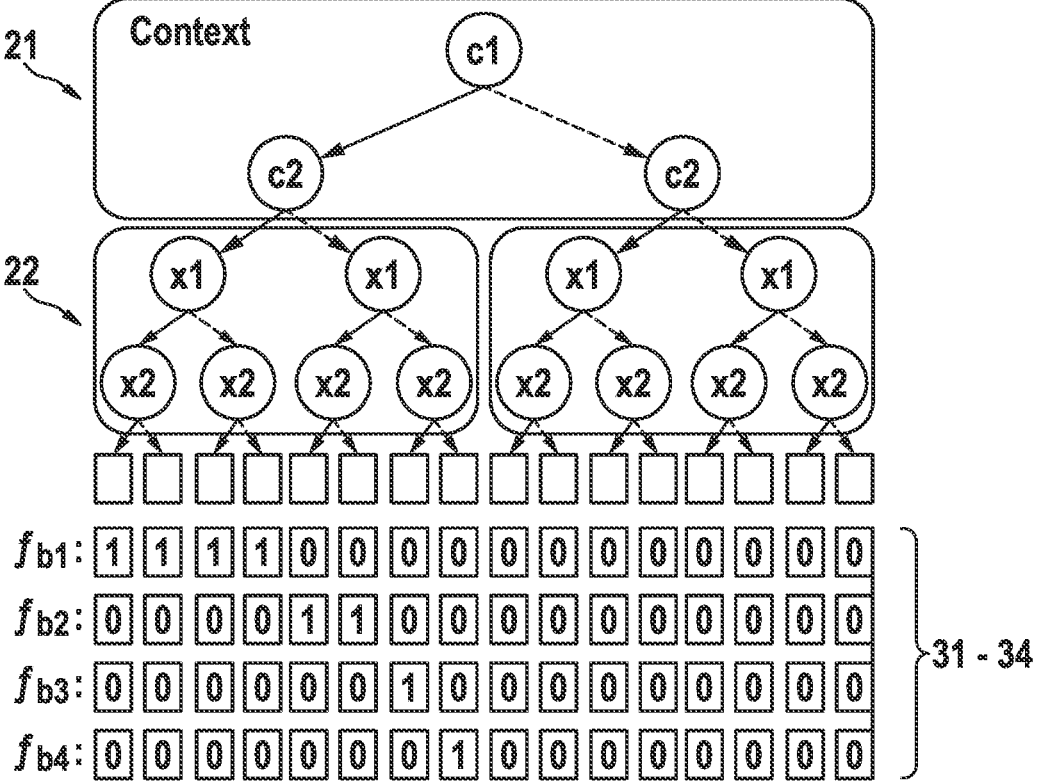
FIG. 2 illustrates the concept according to the present invention of prioritizing possible behaviors of a vehicle using a predefined set of rules with a decision-making process structure with reference to the example of a crosswalk situation.

FIG. 2 illustrates the concept according to the present invention of prioritizing possible behaviors of a vehicle with reference to the example of a traffic situation in which the vehicle approaches a crosswalk. In the exemplary embodiment described here, the rules of the set of rules are structured in a decision-making process structure in the form of a binary decision tree 22, which reflects the prioritization of the individual rules. By applying the binary decision tree 22 to the boundary conditions, determined by the analysis module, of the individual possible behaviors, an unambiguously assignable bitset 31 to 34 is generated for each of these behaviors. The bitsets 31 to 34 encode the leaves of the decision tree 22.

In order to keep the size of the decision tree 22 and thus the number of required bits in the bitset manageable despite a set of rules with a large number of rules, a context decision tree 21 for preclassifying the situation is used here. On the one hand, map information about the traffic infrastructure element "crosswalk" and, on the other hand, perception information, namely object recognition on the crosswalk, are included in the context decision tree 21.

The context decision tree 21 shown here comprises, as the first context condition c1: "Crosswalk ahead (Zebra crossing ahead)." If the context condition c1 is fulfilled, the second context condition c2: "No object/person on crosswalk (No object on zebra)" is queried. If the context condition c2 is fulfilled, the vehicle can simply pass through the crosswalk (Drive through zebra) and checking all possible behaviors related to stopping at or on the crosswalk is unnecessary. Thus, a large portion of the rules of the set of rules that do not relate to pedestrians can be switched to inactive as a result, which is indicated here by the first four entries of the bitset 31 for the Boolean function "$f_{b1}$," which all contain ones. The Boolean function "$f_{b1}$" corresponds to the behavior "Drive through zebra." In this example, only the left quarter of the tree, which corresponds to the occupancy of the context conditions, i.e., in which c1 and c2 reflect the observed context, thus remains.

By means of the decision tree trimmed in this way, the possible behaviors are prioritized, wherein the possible behaviors are first respectively described by a set of boundary conditions that a trajectory must fulfill.

If the context condition c2 is fulfilled, the possible behaviors x1 and x2 of the vehicle can be described as a combination of the following boundary conditions:

x1: "Stopping at the stop line (Stopping at stop line)"
x2: "Stopping before the object (Stopping before object)"

In this combinatorics, three meaningful combinations result: Stopping at the stop line, and thus always before the object, stopping before the object, and evasive maneuvers, i.e., no stopping before the stop line or before the object.

By classifying the possible behaviors according to the decision tree 22, each possible behavior can be assigned a unique bitset, i.e., a characteristic sequence of ones and zeros. In the present exemplary embodiment, the priority is the higher, the further toward the front a one appears in the corresponding bitset.

The prioritization takes place according to decision tree 22, after the first one in the bitset). Accordingly, stopping at the stop line has a higher priority than stopping before the object. Although stopping before the object is only second in the ranking, it is an acceptable solution, which can be realized as a fallback option if stopping at the stop line cannot be implemented for any reason.

The individual possible behaviors of the exemplary embodiment described here can be expressed as bitsets and also in the form of Boolean functions:

| Poss. behavior | Bitset | Boolean function |
|---|---|---|
| Pass through crosswalk | 11 11 00 00 00 00 00 00 | $f_{b1} = c_1 \wedge c_2$ |
| Stopping at the stop line | 00 00 11 00 00 00 00 00 | $f_{b2} = c_1 \wedge \neg c_2 \wedge x_1$ |
| Stopping before the object | 00 00 00 10 00 00 00 00 | $f_{b3} = c_1 \wedge \neg c_2 \wedge \neg x_1 \wedge x_2$ |
| Evasive maneuvers | 00 00 00 01 00 00 00 00 | $f_{b4} = c_1 \wedge \neg c_2 \wedge \neg x_1 \wedge \neg x_2$ |

An alternative to the design with bitsets is a design variant on the basis of binary decision diagrams or on the basis of finite decision diagrams. While a design on the basis of binary decision diagrams represents the decision tree described above only more efficiently than the bitsets, finite decision diagrams extend the binary decision tree to a respective finite number of possible selections per condition.

The exemplary embodiment described above shows that the method according to the present invention provides acceptable behavior proposals for an automated vehicle through a meaningful and skillful degradation of the rules or boundary conditions to be observed, even if the optimal behavior from a performance perspective is not possible.

What is claimed is:

1. A computer-implemented method of an automated driving system for controlling a vehicle, the method comprising the following steps:

(i) obtaining, by a processor system of the vehicle that includes at least one processor, a plurality of real-time sensor signals from one or more sensors of the vehicle sensing surroundings of the vehicle, thereby generating aggregated situation-specific information; and (ii) generating, by the processor system, an environmental model of a current driving situation of the vehicle based on the aggregated situation-specific information, wherein the environmental model comprises a representation of physical surroundings relevant to the vehicle's operational context;

(iii) determining, by the processor system and based on the environmental model and a predefined set of one or more mandatory compliance rules, one or more boundary conditions defining mandatory constraints on permissible behaviors of the vehicle in the current driving situation of the vehicle;

(iv) based on the determined boundary conditions, eliminating, by the processor system, one or more of a plurality of possible behaviors from consideration in a subsequent behavior selection process;

(v) subsequent to the elimination, performing, by the processor system, the behavior selection process by applying a decision-making process structure comprising a predefined set of prioritization rules to remaining behaviors of the plurality of possible behaviors which have not been eliminated by the eliminating step, wherein:

the decision-making process structure comprises a hierarchical sequence of rule evaluations characterized by that the application of the decision-making process structure evaluates a conformity of the remaining behaviors to the predefined set of prioritization rules in an order that is defined by the hierarchical sequence according to relative priorities of the prioritization rules to one another, resulting in, for each of the remaining behaviors, a corresponding rule conformance score that indicates the respective behavior's conformity; and respective values of the rule conformance scores are affected by the order of the evaluation of the conformities;

(vi) based on the rule conformance scores, selecting, by the processor system, one or more of the remaining behaviors, the selection thereby being according to the relative priorities of the prioritization rules to one another without evaluating trajectory-based metrics, wherein the selection of the one or more behaviors is used to generate, by the processor system, a selected motion trajectory for the vehicle; and (vii) performing, by the processor system, a control of an automated drive of the vehicle according to the generated trajectory.

2. The method according to claim 1, wherein, by applying the decision-making process structure to each of the remaining behaviors of the vehicle, a bitset is generated, which encodes, for each respective one of the behaviors, which of the predefined prioritization rules are satisfied, with the remaining behaviors being prioritized based on the generated bitsets.

3. The method according to claim 1, wherein, by applying the decision-making process structure for each of the remaining behaviors, a binary decision diagram is generated, with the remaining behaviors being prioritized based on the generated binary decision diagrams.

4. The method according to claim 1, wherein, by applying the decision-making process structure for each of the remaining behaviors, a finite decision diagram is generated, with the remaining behaviors being prioritized based on the generated finite decision diagrams.

5. The method according to claim 1, wherein the current driving situation is preclassified based on the environmental model by assigning the current driving situation to at least one situation class from a set of specified situation classes, and, when prioritizing the remaining behaviors, the decision-making process structure is limited to those of the prioritization rules that can be applied to situations of the at least one situation class ascertained in this way.

6. The method according to claim 5, wherein a context decision tree is used to preclassify the current driving situation.

7. The method according to claim 1, wherein the predefined set of prioritization rules includes safety requirements and/or traffic rules and/or comfort requirements and/or technical vehicle boundary conditions.

8. The method according to claim 1, wherein at least one of the possible behaviors of the vehicle in the given situation is defined by:

at least a portion of the boundary conditions determined based on the environmental model, or a set of behavior instructions that implement at least a portion of the boundary conditions determined based on the environmental model.

9. The method according to claim 1, further comprising: subsequent to the selected motion trajectory being generated by the selection of the one or more of the remaining behaviors, optimizing at least a part of the selected motion trajectory with respect to a specified quality function.

10. A computer-implemented system for controlling a vehicle, the system comprising:

one or more sensors; and a processor system that includes at least one processor, the processor system being configured to:

(i) obtain a plurality of real-time sensor signals from one or more sensors of the vehicle sensing surroundings of the vehicle, thereby generating aggregated situation-specific information;

(ii) generate an environmental model of a current driving situation of the vehicle based on the aggregated situation-specific information, wherein the environmental model comprises a representation of physical surroundings relevant to the vehicle's operational context;

(iii) determine, based on the environmental model and a predefined set of one or more mandatory compliance rules, one or more boundary conditions defining mandatory constraints on permissible behaviors of the vehicle in the current driving situation of the vehicle;

(iv) based on the determined boundary conditions, eliminate one or more of a plurality of possible behaviors from consideration in a subsequent behavior selection process;

(v) subsequent to the elimination, perform the behavior selection process by applying a decision-making process structure comprising a predefined set of prioritization rules to remaining behaviors of the plurality of possible behaviors which have not been eliminated by the elimination step, wherein:

the decision-making process structure comprises a hierarchical sequence of rule evaluations characterized by that the application of the decision-making process structure evaluates a conformity of the remaining behaviors to the predefined set of prioritization rules in an order that is defined by the hierarchical sequence according to relative priorities of the prioritization rules to one another, resulting in, for each of the remaining behaviors, a corresponding rule conformance score that indicates the respective behavior's conformity; and respective values of the rule conformance scores are affected by the order of the evaluation of the conformities;

(vi) based on the rule conformance scores, select one or more of the remaining behaviors, the selection thereby being according to the relative priorities of the prioritization rules to one another without evaluating trajectory-based metrics, wherein the selection of the one or more behaviors is used to generate, by the processor system, a selected motion trajectory for the vehicle; and (vii) perform a control of an automated drive of the vehicle according to the generated trajectory.

11. The system according to claim 10, wherein the processor system is configured to perform a preclassification of the current driving situation based on the environmental model and by taking a set of specified situation classes as a basis.

12. The system according to claim 11, wherein, as a function of the preclassification of the given situation, different parts of the predefined set of prioritization rules can be activated and deactivated.

13. The method according to claim 1, wherein the evaluation of the conformity of the remaining behaviors to the predefined set of prioritization rules is performed without the generation of the motion trajectory that will be using the decision-making process structure.

* * * * *